Figure 1:
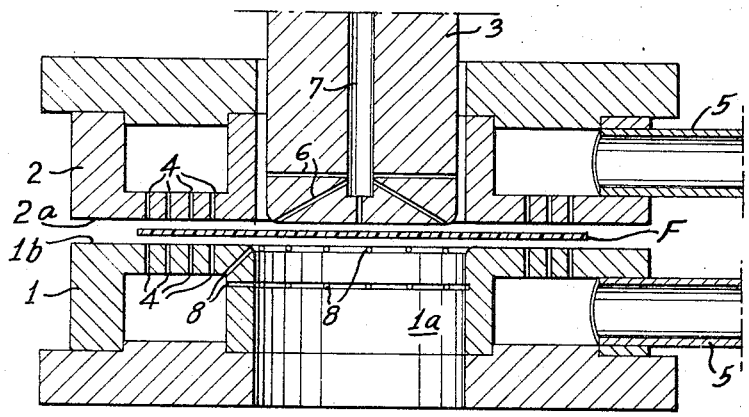

Oct. 24, 1967  R. BECK  3,349,153

PROCESS FOR DEEP-DRAWING FILMS AND FOILS

Filed Oct. 1, 1963

INVENTOR.
RUDOLF BECK
BY
ATTORNEY 3,349,153
PROCESS FOR DEEP-DRAWING FILMS AND FOILS
Rudolf Beck, Wiesbaden, Germany, assignor to Kalle
Aktiengesellschaft, Wiesbaden-Biebrich, Germany
Filed Oct. 1, 1963, Ser. No. 313,727
Claims priority, application Germany, Oct. 4, 1962,
K 47,887
8 Claims. (Cl. 264—89)

This invention relates to a process for deep-drawing films and foils.

It is known to manufacture shaped articles from synthetic plastic films and from composite products including a synthetic plastic film and a metal foil, by deforming them in depth, the films being clamped between clamping jaws and pressed into a hollow mold by means of a ram or by means of compressed air. In the performance of this method, the clamped margins of the films are sometimes allowed to slide slightly between the clamping jaws during the deep-drawing operation in order to feed additional film into the deep-drawing die during the deep-drawing operation. Allowing the film margins to slide between the clamping jaws by reducing the clamping pressure is unsatisfactory because this often produces wavy edges in the clamped film. It therefore has been a preferred expedient to coat films used in deep-drawing with a lubricant so that when, at a given clamping pressure, the tension acting on the films exceeds a certain value, the films are enabled to slide between the clamping jaws.

The present invention provides a method of deep-drawing a clamped synthetic plastic film or a metal foil or a loose or permanent combination of a synthetic plastic film and a metal foil, wherein the film or foil slides between the clamping jaws in a more advantageous manner, in which compressed air is injected between at least one clamping jaw and the film or foil. As "clamping jaws" are understood those components of a deep-drawing machine in which the film or foil is clamped during the deep-drawing operation. These components of the machine may have no other object than the firm holding of the film or foil. In many cases, however, these components have other functions as well; thus, for example, one clamping jaw may be formed by the die and the other by a hold-down means. The compressed air is injected under a pressure of a few atmospheres (gauge), for example 10 atmospheres. The optimum air pressure depends on the conditions of performing the method, for example on the thickness of the film or foil, the tensile strength of the film or foil material at the deep-drawing temperature used, the size of the film or foil to be deep-drawn, or on the working speed, and is easy to determine by a simple test in each case. Instead of compressed air, it is, of course, possible to use any other inert compressed gas. Even when compressed air is injected in only one clamping jaw the sliding of the film edges is facilitated, but it is most advantageous to supply compressed air to both clamping jaws.

The present method can be applied quite generally to deep-drawing material of plastics or metals. It is found to be most useful for shaping metal foils and compound foils in which a plastic film is combined with a metal foil, for example an aluminum foil, or a plastic film is to be worked up in conjunction with a metal foil. The film or foil is most advantageously subjected to deep-drawing in the shape of a unit blank. When films or foils in web form are to be deep-drawn it is, therefore, generally advantageous to sever the appropriate piece of film or foil from the web before the deep-drawing operation. However, this step is not an essential feature of the method of the invention; in fact, it is possible to leave the utilized foil section as part of the film web until the deep-drawing operation has begun or has been completed.

The present method is most advantageously carried out with the use of a ram which performs the deep-drawing in conjunction with a die. To facilitate the sliding of the film or foil to be shaped with respect to the ram, compressed air may also be injected between the ram and the film or foil. The same applies to the die; compressed air may be injected between the die and the film or foil during the deep-drawing operation.

Figure 2:
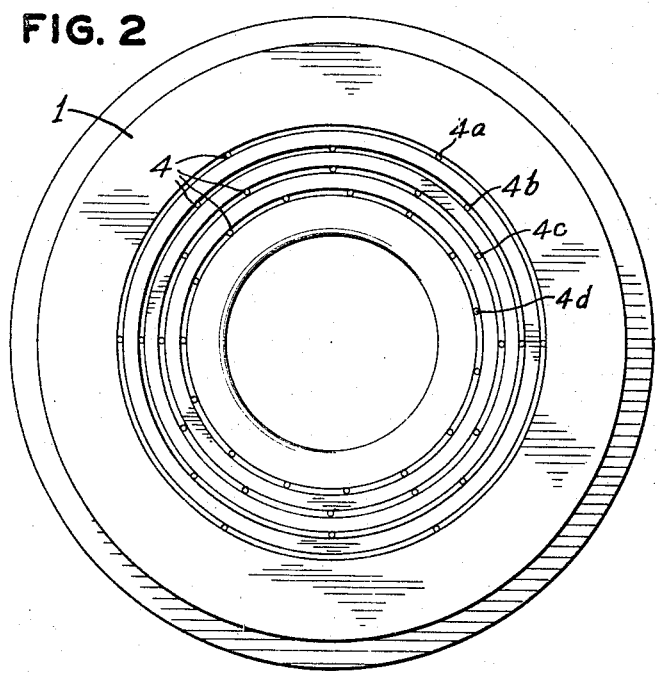

One embodiment of an apparatus used in the method of the invention is illustrated in the accompanying drawings, in which:

FIGURE 1 is a side elevation in axial section and
FIGURE 2 is a plan view of the lower portion of the apparatus (not showing the air inlet duct).

Referring to the drawings, the deep-drawing apparatus comprises a die 1, a hold-down means 2 and a deep-drawing ram 3. The die 1 has a cavity 1a which determines the shape of the finished article, and the drawing ram 3 suitably engages in it. The face 1b of the die 1 serves as one clamping jaw for a film F. The hold-down means 2 constitutes the second clamping jaw and has a lower face 2a which presses on top of the film. The die 1 and the hold-down means 2 include a plurality of air channels 4, one end of each of which is in the face 1b or 2a respectively. The ends of the channels connect with concentric grooves in the faces 1b and 2a of the clamping jaws pressing on the foil. The grooves also may be straight or form a network. The other ends of the channels 4 connect to the manifolds 5 through which, during the operation of the deep-drawing apparatus, compressed air is injected. When the pressure used is sufficiently high, the air is caused to issue through the channels 4 between the film F and the surfaces 1b and 2a.

Generally, the two clamping jaws are biased together by spring action and biased apart during the deep-drawing process by the compressed air injected through the channels 4 between the film and clamping jaws against the spring pressure, until the film starts to slide.

During the deep-drawing operation, the air channels 4a in the outermost zone are uncovered first when the foil slides. The air issuing from them no longer meets the resistance to flow which had been caused up to that stage by the film F. Since there are relatively few air channels in the outermost zone, the total cross-section of the first exposed air ducts 4a is relatively small so that relatively little compressed air escapes. The next air channels to be exposed by the sliding film F are the air channels 4b located on shorter radii, and so on until none of the air channels 4 is covered by the film web F. This arrangement of air channels has given good results in large scale production.

Air channels 6 are provided leading to those faces of the ram 3 which slide over the film surface during deep-drawing. These air channels are connected to a manifold 7 through which compressed air may be directed on to the sliding faces of the ram. Similarly, in those faces of the die along which the film must slide during deep-drawing, there are provided air ducts 8 connected to the same manifold 5 which is connected to the air channels 4 through the die 1 leading to the clamping face 1b.

The method of the invention and the apparatus for the performance thereof offer the advantage that it is possible to dispense with lubricants which adhere to the film or foil, for example oils, fats or graphite, so that after the deep-drawing no traces of lubricant remain adhering to the shaped film or foil. It is another advantage that it is possible to adjust the amount of slip of the film or foil between the clamping jaws within close limits. Also, the slip may be caused to occur only at a desired stage of the deep-drawing operation, while on a film or foil coated with a lubricant, slip may occur at any indeterminate period from the start of the operation.

It will be obvious to those skilled in the art that many modifications may be made within the scope of the present invention without departing from the spirit thereof, and the invention includes all such modifications.

What is claimed is:

1. A process for deep-drawing a deformable article which comprises clamping the article at the outer margin thereof, and deforming the article in an intermediate deforming zone while relieving the clamping pressure by conducting a compressed gas to at least one of the clamped surfaces, whereby the margin is permitted to slide inwardly and the original area of deformation of the article is increased.

2. A process according to claim 1 in which a compressed gas is conducted to both of the clamped surfaces.

3. A process according to claim 1 in which a compressed gas is conducted to the deforming zone.

4. A process according to claim 1 in which a compressed gas is conducted to the deforming zone on both sides of the deformable article.

5. A process according to claim 1 in which the compressed gas is air.

6. A process according to claim 1 in which the deformable article is a synthetic plastic film.

7. A process according to claim 1 in which the deformable article is a metal foil.

8. A process according to claim 1 in which the deformable article is a plastic film-metal foil combination.

References Cited

UNITED STATES PATENTS

| | | | |
|---|---|---|---|
| 1,861,337 | 5/1932 | Ernst | 72—351 |
| 2,120,328 | 6/1938 | Ferngren | 264—335 X |
| 2,632,227 | 3/1953 | Steele et al. | 18—2 |
| 2,733,493 | 2/1956 | Bryer. | |
| 2,821,156 | 1/1958 | Lyon. | |
| 2,973,558 | 3/1961 | Stratton | 264—89 |
| 3,152,564 | 10/1964 | Gardner | 72—351 X |

ROBERT F. WHITE, *Primary Examiner.*

A. R. NOË, *Assistant Examiner.*